(12) United States Patent
Skov

(10) Patent No.: US 11,286,960 B2
(45) Date of Patent: Mar. 29, 2022

(54) METHOD FOR CONTROLLING A HYDRAULIC ACTUATOR

(71) Applicant: Danfoss Power Solutions ApS, Nordborg (DK)

(72) Inventor: Kim Skov, Nordborg (DK)

(73) Assignee: DANFOSS POWER SOLUTIONS APS, Nordborg (DK)

(*) Notice: Subject to any disclaimer, the term of this patent is extended or adjusted under 35 U.S.C. 154(b) by 0 days.

(21) Appl. No.: 16/688,201

(22) Filed: Nov. 19, 2019

(65) Prior Publication Data
US 2020/0158141 A1    May 21, 2020

(30) Foreign Application Priority Data
Nov. 21, 2018   (EP) ..................................... 18207584

(51) Int. Cl.
| E02F 9/22 | (2006.01) |
| F15B 7/00 | (2006.01) |
| F15B 7/06 | (2006.01) |
| F16K 11/07 | (2006.01) |

(52) U.S. Cl.
CPC ............ *F15B 7/001* (2013.01); *E02F 9/2264* (2013.01); *F15B 7/06* (2013.01); *F16K 11/0712* (2013.01)

(58) Field of Classification Search
CPC ........ F15B 7/001; F15B 13/026; B66C 23/86; B66C 13/20; F16K 11/0712; E02F 9/2264
See application file for complete search history.

(56) References Cited

U.S. PATENT DOCUMENTS

| 5,271,227 A | * | 12/1993 | Akiyama | E02F 9/2232 60/422 |
| 6,170,262 B1 | * | 1/2001 | Yoshimura | E02F 9/2228 60/452 |
| 6,209,321 B1 | | 4/2001 | Ikari | |
| 6,305,162 B1 | * | 10/2001 | Cobo | E02F 9/2221 60/422 |
| 6,308,516 B1 | * | 10/2001 | Kamada | E02F 9/2228 60/450 |
| 2003/0121257 A1 | | 7/2003 | Skinner | |

FOREIGN PATENT DOCUMENTS

| CN | 1047724 A | 12/1990 |
| CN | 101379302 A | 3/2009 |
| CN | 107532618 A | 1/2018 |

OTHER PUBLICATIONS

Chinese Office Action and English Translation for Serial No. 201911153985.0 dated Jul. 9, 2021.

* cited by examiner

*Primary Examiner* — Abiy Teka
(74) *Attorney, Agent, or Firm* — McCormick, Paulding & Huber PLLC

(57) ABSTRACT

A method for controlling a hydraulic actuator (2) of a system (1) by means of a valve having a valve element is described. A position of the valve element determines a pressure supplied to a hydraulic actuator (2). In such a method a variable dead band should be minimized. To this end a start position of the valve element is preadjusted as a function of at least one parameter outside the hydraulic actuator (2).

21 Claims, 2 Drawing Sheets

METHOD FOR CONTROLLING A HYDRAULIC ACTUATOR

CROSS-REFERENCE TO RELATED APPLICATION

This application claims foreign priority benefits under 35 U.S.C. § 119 to European Patent Application No. 18207584.6 filed on Nov. 21, 2018, the content of which is hereby incorporated by reference in its entirety.

TECHNICAL FIELD

The present invention relates to a method for controlling a hydraulic actuator of a system by means of a valve having a valve element, wherein a position of the valve element determines a pressure supplied to the hydraulic actuator.

BACKGROUND

In the following a crane is used as an example of a system in which a hydraulic actuator should be controlled. However, the invention is not limited to a crane.

The hydraulic actuator is used to move something against a force, for example, to lift a load. Before the actuator can move, a pressure supplied to the actuator must be sufficient to overcome the force. When, for example, the actuator is controlled by means of a valve which is actuated by a joystick, the joystick has to be moved over a certain extend before the actuator can move. This gives a feeling of a dead band and the dead band is variable because it depends on the forces acting on the actuator in opposite direction to the actuating direction of the actuator.

A problem arises in particular in connection with high inertia functions, such as, but not limited to crane arms operated via a hydraulic motor or cylinder which are commonly referred to as "actuator". Very often it is a challenge to achieve smooth slewing without sacrificing on energy consumption or controllability. When initiating a slewing movement, the hydraulic actuator has to overcome static friction as well as acceleration of an inertia. The contribution to the total inertia is the sum of crane inertia plus load inertia. Overcoming static friction leads into an overshoot in pressure which consequently can lead into an oscillating movement if using a flow-controlled valve section.

Such oscillations can be reduced by adding a back pressure to the flow-controlled input to the actuator in order to reduce influence of the static friction and initial load acceleration. However, this method increases the power required to do the work.

To improve control of the oscillations a pressure control valve can be used. Such a valve controls a fixed pressure and will consequently control a fixed force to the actuator providing a dampening effect to the oscillations. However, this method is sensitive to external load conditions on the actuator as it would give a load dependent dead band and load dependent flow and consequently actuator speed.

SUMMARY

The object underlying the present invention is to minimize a variable dead band in the control of a hydraulic actuator.

This object is solved with a method as described at the outset in that a start position of the valve element is preadjusted as a function of at least one parameter outside the hydraulic actuator.

Accordingly, the operator experiences immediately a movement of the actuator when he operates the valve. The corresponding pre-adjustment of the valve element is influenced by conditions of the systems outside the actuator. This does not necessarily exclude that parameters depending directly on the actuator itself are used for controlling the valve element of the valve. However, in any case the at least one parameter outside the hydraulic actuator is used. "Outside the hydraulic actuator" means that the parameter is neither detected inside the actuator (for example a pressure) nor directly controlled by the actuator.

In an embodiment of the invention the valve is a spool valve and the valve element is a spool, wherein the spool is shifted in the spool valve. The valve element is shifted to a "start position", wherein the start position depends on conditions outside the hydraulic actuator.

In an embodiment of the invention the valve element is driven electrically or hydraulically. In other words, there is no direct mechanical connection between an input device, for example a joystick, and the spool or valve element. This facilitates the pre-adjustment of the valve element.

In an embodiment of the invention at least one parameter is a load dependent parameter. A load in the system outside the hydraulic actuator in question influences, for example, an initial friction which has to be overcome by the actuator. Accordingly, even if this friction cannot be determined exactly, the valve element can be preadjusted to the starting position in which, for example, this static friction can be overcome.

In an embodiment of the invention the parameter is a pressure in another hydraulic actuator in the system. When, for example, the actuator in question is used for performing a slewing motion of a crane, the pressure in an actuator actuating a main boom of the crane can be used as further parameter.

In an embodiment of the invention the start position is obtained by at least a look-up table, wherein the look-up table shows a relation between the parameter and the start position. The look-up table can be produced in advance. The look-up table can have two dimensions or more dimensions, as required.

In an embodiment of the invention the valve element is controlled by an input device wherein a resolution of the input device is scaled to a distance between the start position and an end position of the valve element. When, for example, the valve element has been moved to a position of 42% of its maximum stroke to produce a starting pressure, the remaining 58% of the stroke of the valve element are mapped to the maximum stroke of the input device. This allows for a more precise controlling of the actuator even under higher load.

In an embodiment of the invention at least one parameter is a parameter dependent on a geometry of the system. In this case, not only the weight of a load, but also the geometry of the system can be taken into account. When, for example, the parameter is a pressure in an actuator actuating the main boom of a crane, the position of this actuator gives additional information about the geometry of the crane which influences the static friction when starting the slewing motion.

In an embodiment a position of at least one other actuator in the system is measured. The term "position" means in this context a position which has been changed by the operation of the actuator. When, for example, the actuator is a hydraulic cylinder, the position is the extension of a rod of the cylinder. When the actuator is a rotary actuator, the position is, for example, an angle of rotation.

In an embodiment of the invention the system comprises a crane and the actuator is a slewing motor of the crane. In this case the method can minimize the dead band for slewing the boom of the crane.

BRIEF DESCRIPTION OF THE DRAWINGS

An embodiment of the invention will now be described in more detail with reference to the drawing, wherein:

FIG. 1 schematically shows a crane 1 as an example for a system in which an actuator 2 is to be controlled.

DETAILED DESCRIPTION

Figure 1:
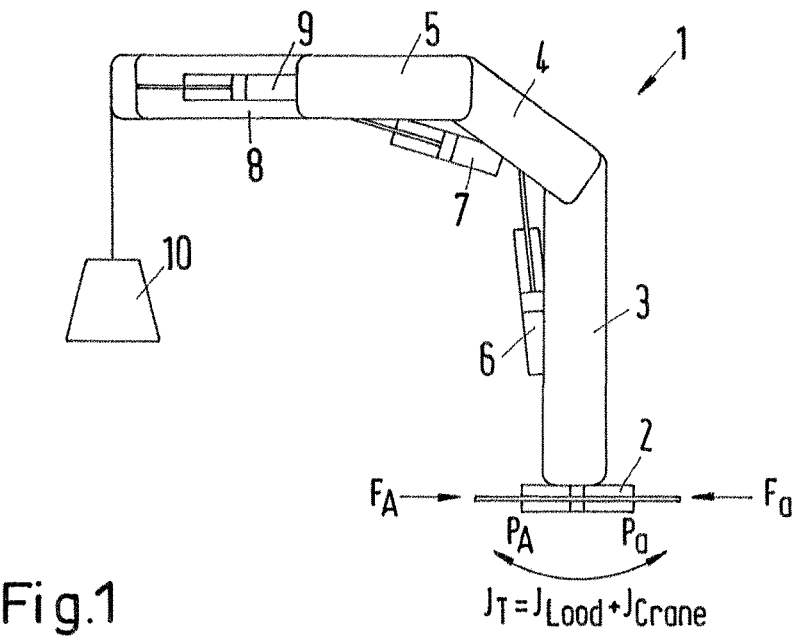
FIG. 1 shows a crane as an example of a system.

The crane 1 comprises a slewing motor, i.e. a hydraulic actuator 2 driving a mast 3 in a slewing motion, a main boom 4 and an arm 5. The main boom 4 can be moved relative to the mast 3 my means of a main boom cylinder 6 which is another hydraulic actuator. The arm 5 can be moved relative to the main boom 4 by means of an arm cylinder 7 and the arm 5 comprises an extension 8 which can be moved by means of an extension cylinder 9. A load 10 is to be lifted by the crane 1.

During operation of the crane 1 the mast 3 performs a slewing motion. To this end the actuator 2 has to be operated, i.e. hydraulic liquid having a sufficient pressure has to be supplied to the actuator 2. The pressure of this hydraulic fluid is controlled by a valve (not shown) which is in most cases a spool valve having a spool which can be moved between two end positions. In a first end position the pressure supplied to the actuator 2 is at a minimum or at zero and in the second end position the pressure supplied to the actuator 2 is a maximum pressure.

When the actuator 2 is operated to initiate a slewing movement, the actuator 2 has to overcome static friction as well as the acceleration of an inertia. The inertia depends among others on the mass of the load 10. Furthermore, it depends on the geometry. When, for example, the extension 8 is extended farther, the inertia is larger. The contribution to the total inertia is the sum of the crane inertia plus load inertia. Overcoming static friction leads to an overshoot in pressure which consequently can lead into an oscillating movement if using a flow-controlled valve section.

To avoid or minimize such an oscillating movement a back pressure can be used which is added to the flow-controlled input in order to reduce the influence of the static friction and initial load acceleration. However, this way increases the power required to operate the actuator 2.

Another way to minimize or avoid the oscillations is to use a pressure control valve. As it controls a fixed pressure it will consequently control a fixed force to the actuator providing a dampening effect to the oscillations. However, this method is sensitive to external load conditions on the actuator 2, as it would give a load dependent dead band and load dependent flow and consequently actuator speed which has to become by the hydraulic actuator 2 is large, the input device has to be moved to a certain extend before the operator sees a movement of the actuator 2. Such a "dead band" is not desired. The dead band is variable, since it depends on varying load conditions in the system.

In order to avoid or minimize such a dead band, the valve is a pressure control valve in which the pressure at the output of the valve is controlled by the position of a valve element within the valve. In this way, it is possible to compensate for the variable dead band. The position of the valve element is preadjusted. In other words, a starting position of the valve element is controlled. This pre-adjustment is made as a function of at least one parameter outside the hydraulic actuator, i.e. by a parameter which is neither directly controlled or influenced by the actuator 2 nor can be detected inside the actuator 2.

Figure 2:
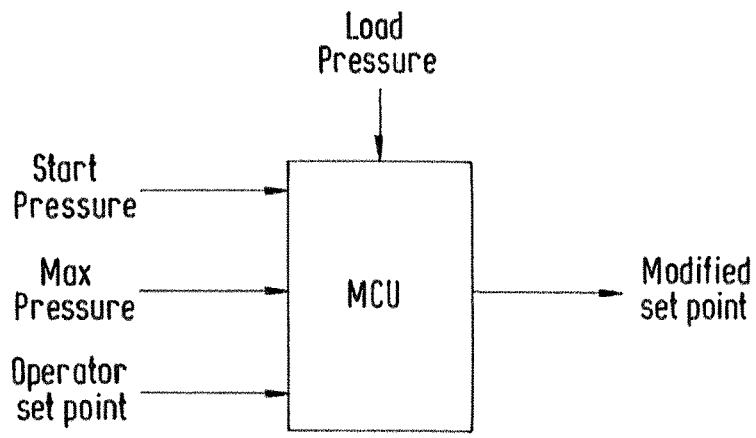
FIG. 2 shows schematically a way to obtain a modified setpoint.
Figure 3:
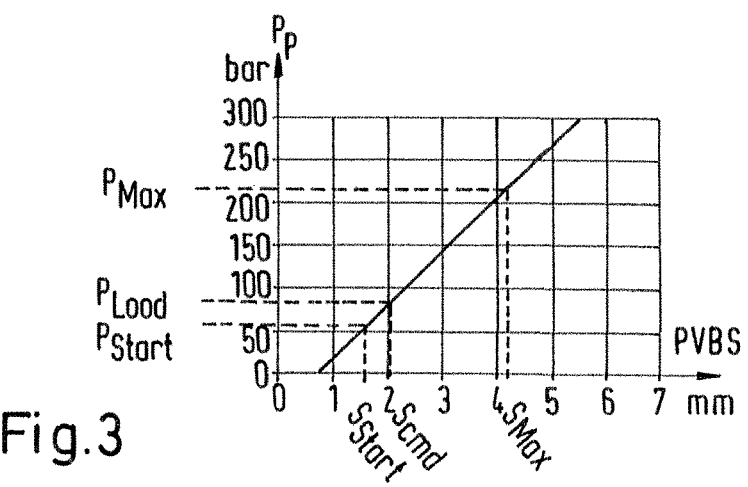
FIG. 3 shows schematically a graph to determine a starting position of a valve element and FIG. 4 shows schematically a flow chart of the method.

The position of the valve element is preferably controlled by an auxiliary drive, i.e. the valve element is driven electrically or hydraulically. The command for moving the valve element is given by an input device. The input device is used by the operator to demand a certain set point to the auxiliary drive, i.e. to the electrical or hydraulical drive of the valve element. This is schematically shown in FIG. 2. An operator set point is supplied to a microcontroller unit (MCU). The MCU performs an algorithm in which an initial start pressure request as well as an external load pressure acting outside the actuator 2 is used to compensate for the variable dead band or the variable dead band feeling. A modified set point can be expressed using the following function:

$$S_{Cmd} = S_{Start} + f(P_{Start} + P_{Load}).$$

In this function $S_{Cmd}$ is the modified set point.

$S_{Start}$ is the start position threshold at a first input command outside neutral position of the valve element.

$P_{Start}$ is the start pressure request.

$P_{Load}$ is the load pressure input.

The load pressure input is an example for a parameter. Other parameters can be used as well. For example, the modified set point $S_{Cmd}$ of the actuator 2 could be indirectly calculated using a pressure sensor in the main boom cylinder 6.

Furthermore, it would be possible to use additionally parameters which depend on the geometry of the system. For example, a tilt sensor on the chassis can be used to obtain an information about an inclination of the crane. Furthermore, a position sensor in the main boom cylinder 6 can be used to obtain an information about the radial distance of the load 10 from the mast 3.

Figure 4:
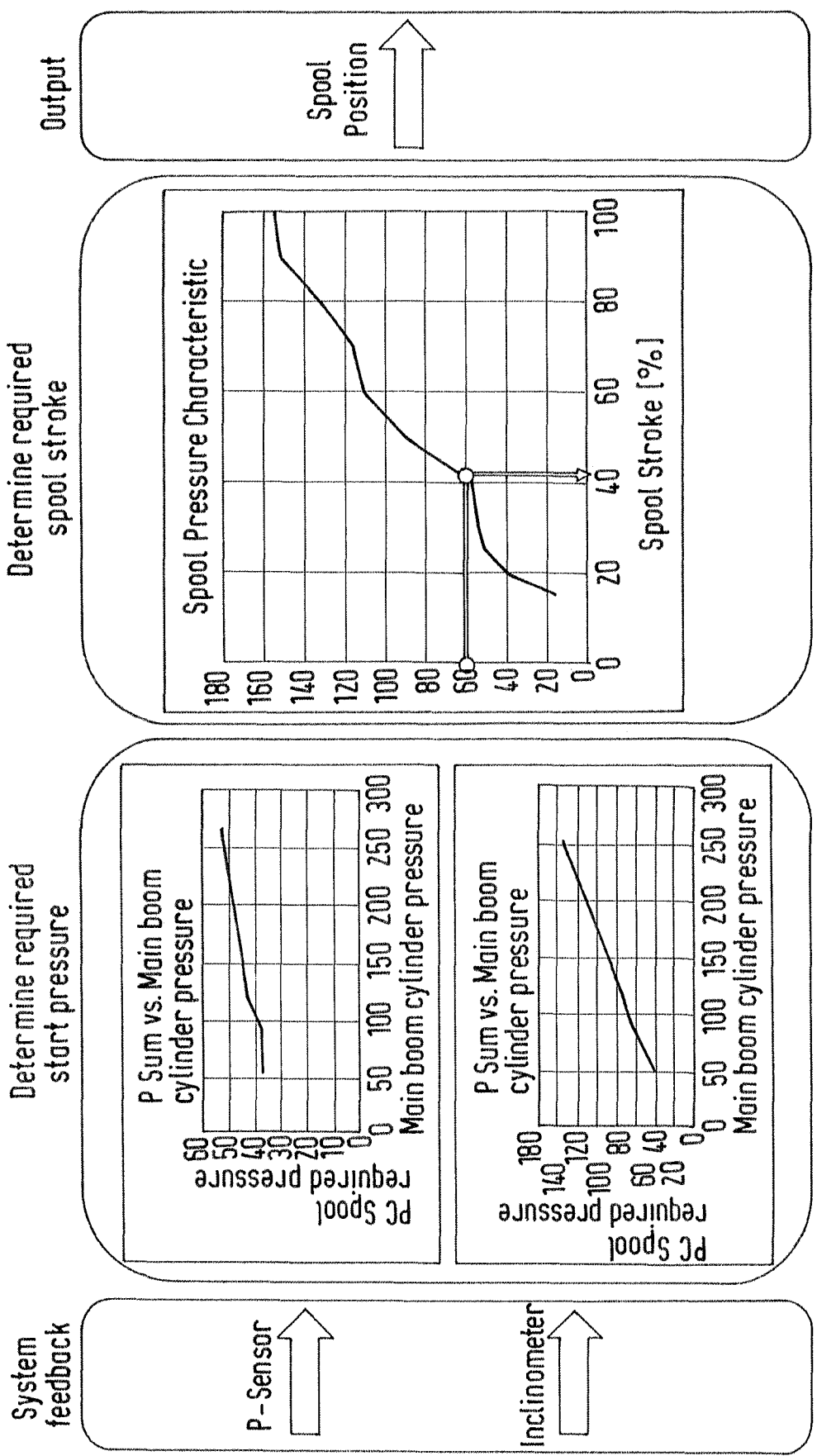

This is again shown in FIG. 4. The system delivers a system feedback comprising a pressure, for example, in the main boom cylinder 6 by means of a P-Sensor and an information about an inclination by means of the mentioned tilt sensor or inclinometer.

Based on the system feedback the required start pressure is determined. Shown are two curves showing the pressure required for actuating the actuator 2 over the main boom cylinder pressure. The upper graph shows the function for the pressure only. The lower graph shows a situation in which in addition inclination of the crane has been taken into account.

Knowing the required starting pressure as well as knowing the characteristic of the valve (e.g. pressure versus spool stroke), it is possible to compensate for the variable dead band feeling by putting the spool to the correct position as soon as an operator input is given.

The information mentioned above is converted into a spool position command. If, for example, it is calculated that a required start pressure is 60 bar, the look-up table for the required position of the valve element, e.g. the spool position, is used. This is shown in the next field ("Determine required spool stroke"). Having a required start pressure of 60 bar will lead to a position of the spool (or other valve element) to be in 42% of the full stroke.

The joystick resolution from 0-100% is scaled to the spool 42-100% so that no dead band is felt in the joystick, however, the resolution of the joystick movement is made as high as possible.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for controlling a hydraulic actuator of a system by means of a valve having a valve element, wherein the valve element is controlled by an input device, wherein a position of the valve element determines a pressure supplied to the hydraulic actuator, and wherein a start position of the valve element is pre-adjusted as a function of at least one parameter outside the hydraulic actuator before a command for moving the valve element is given by the input device, wherein outside the hydraulic actuator means that the at least one parameter is neither detected inside the actuator nor directly controlled by the actuator, and wherein the pre-adjustment of the valve element start position comprises a controller determining a modified start position based on the at least one parameter outside the hydraulic actuator.

2. The method according to claim 1, wherein the valve is a spool valve and the valve element is a spool, wherein the spool is shifted in the spool valve.

3. The method according to claim 2, wherein the valve element is driven electrically or hydraulically.

4. The method according to claim 2, wherein the at least one parameter is a load dependent parameter.

5. The method according to claim 2, wherein the at least one parameter is a pressure in another hydraulic actuator of the system.

6. The method according to claim 2, wherein the start position is obtained by at least a look-up table, wherein the look-up table shows a relation between the at least one parameter and the start position.

7. The method according to claim 1, wherein the valve element is driven electrically or hydraulically.

8. The method according to claim 7, wherein the at least one parameter is a load dependent parameter.

9. The method according to claim 7, wherein the at least one parameter is a pressure in another hydraulic actuator of the system.

10. The method according to claim 7, wherein the start position is obtained by at least a look-up table, wherein the look-up table shows a relation between the at least one parameter and the start position.

11. The method according to claim 1, wherein the at least one parameter is a load dependent parameter.

12. The method according to claim 11, wherein the start position is obtained by at least a look-up table, wherein the look-up table shows a relation between the at least one parameter and the start position.

13. The method according to claim 1, wherein the at least one parameter is a pressure in another hydraulic actuator of the system.

14. The method according to claim 13, wherein the start position is obtained by at least a look-up table, wherein the look-up table shows a relation between the at least one parameter and the start position.

15. The method according to claim 1, wherein the start position is obtained by at least a look-up table, wherein the look-up table shows a relation between the at least one parameter and the start position.

16. The method according to claim 1, wherein a resolution of the input device is scaled to a distance between the start position and an end position of the valve element.

17. The method according to claim 1, wherein the at least one parameter is a parameter dependent on a geometry of the system.

18. The method according to claim 8, wherein a position of at least one other actuator in the system is measured.

19. The method according to claim 1, wherein the system comprises a crane and the actuator is a slewing motor of the crane.

20. The method according to claim 1, wherein the controller is a microcontroller.

21. A method for controlling a hydraulic actuator of a system by means of a valve having a valve element, wherein a position of the valve element determines a pressure supplied to the hydraulic actuator, wherein a start position of the valve element is pre-adjusted as a function of at least one parameter outside the hydraulic actuator, wherein the at least one parameter is a pressure in another hydraulic actuator of the system, and wherein the pre-adjustment of the valve element start position comprises a controller determining a modified start position based on the at least one parameter outside the hydraulic actuator.

* * * * *

UNITED STATES PATENT AND TRADEMARK OFFICE
CERTIFICATE OF CORRECTION

| | |
|---|---|
| PATENT NO. | : 11,286,960 B2 |
| APPLICATION NO. | : 16/688201 |
| DATED | : March 29, 2022 |
| INVENTOR(S) | : Kim Skov |

It is certified that error appears in the above-identified patent and that said Letters Patent is hereby corrected as shown below:

In the Claims

Column 6, Claim 18, Line 30, "claim 8" should read --claim 17--.

Signed and Sealed this
Thirty-first Day of May, 2022

Katherine Kelly Vidal
*Director of the United States Patent and Trademark Office*